United States Patent
Zhao

(10) Patent No.: US 11,403,818 B2
(45) Date of Patent: Aug. 2, 2022

(54) THREE-DIMENSIONAL RECONSTRUCTION METHOD, APPARATUS AND SYSTEM, MODEL TRAINING METHOD AND STORAGE MEDIUM

(71) Applicant: BOE Technology Group Co., Ltd., Beijing (CN)

(72) Inventor: Jibo Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 73 days.

(21) Appl. No.: 17/043,061

(22) PCT Filed: Mar. 4, 2020

(86) PCT No.: PCT/CN2020/077850
§ 371 (c)(1),
(2) Date: Sep. 29, 2020

(87) PCT Pub. No.: WO2020/215898
PCT Pub. Date: Oct. 29, 2020

(65) Prior Publication Data
US 2021/0375036 A1  Dec. 2, 2021

(30) Foreign Application Priority Data

Apr. 24, 2019  (CN) .......................... 201910333474.0

(51) Int. Cl.
*G06T 17/10* (2006.01)
*G06T 7/73* (2017.01)
(Continued)

(52) U.S. Cl.
CPC ................ *G06T 17/10* (2013.01); *A47G 1/02* (2013.01); *G06T 7/0002* (2013.01); *G06T 7/60* (2013.01);
(Continued)

(58) Field of Classification Search
None
See application file for complete search history.

(56) References Cited

U.S. PATENT DOCUMENTS 6,356,272 B1 *  3/2002  Matsumoto ............. G06T 15/10
345/582
2009/0160858 A1  6/2009  Chen et al.
(Continued)

FOREIGN PATENT DOCUMENTS

CN  102244732 A  11/2011
CN  104992441 A  10/2015
(Continued)

OTHER PUBLICATIONS

International search report of PCT application No. PCT/CN2020/077850 dated May 28, 2020.

*Primary Examiner* — James A Thompson
(74) *Attorney, Agent, or Firm* — Fay Sharpe LLP

(57) ABSTRACT

A three-dimensional reconstruction method includes: acquiring first images captured by a first camera, each of the first images being an image containing a target object; determining a shooting angle of the each of the first images, the shooting angle being configured to characterize a shooting direction relative to the target object when the first camera shoots the first images; determining an angle interval corresponding to the each of the first images from a plurality of angle intervals included in an angle range [0, 360°) based on the shooting angle, and setting the first image as a target image in the angle interval; and three-dimensionally reconstructing the target object based on the target images in the respective angle intervals to obtain a three-dimensional image of the target object.

17 Claims, 10 Drawing Sheets

(51) Int. Cl.
*A47G 1/02* (2006.01)
*G06T 7/60* (2017.01)
*G06T 7/00* (2017.01)

(52) U.S. Cl.
CPC ...... *G06T 7/73* (2017.01); *G06T 2207/20081* (2013.01)

(56) References Cited

U.S. PATENT DOCUMENTS

2015/0359462 A1* 12/2015 Laan .................... A61B 5/1077 348/47
2019/0385359 A1* 12/2019 Russell .................... G06T 7/507
2021/0343022 A1* 11/2021 Cohen .................... G01S 13/931

FOREIGN PATENT DOCUMENTS

| CN | 108053476 A | * | 5/2018 | ............. G06T 17/10 |
| CN | 108053476 A | | 5/2018 | |
| CN | 109272576 A | | 1/2019 | |
| CN | 109377524 A | | 2/2019 | |
| CN | 109461180 A | | 3/2019 | |

* cited by examiner

THREE-DIMENSIONAL RECONSTRUCTION METHOD, APPARATUS AND SYSTEM, MODEL TRAINING METHOD AND STORAGE MEDIUM

CROSS-REFERENCE TO RELATED APPLICATION

The present disclosure is a 371 of PCT Application No. PCT/CN2020/077850, filed on Mar. 4, 2020, which claims priority to Chinese Patent Application No. 201910333474.0, filed on Apr. 24, 2019 and entitled "THREE-DIMENSIONAL RECONSTRUCTION METHOD, APPARATUS AND SYSTEM, MODEL TRAINING METHOD AND STORAGE MEDIUM", the entire contents of which are incorporated herein by reference.

TECHNICAL FIELD

Embodiments of the present disclosure relate to a three-dimensional reconstruction method, apparatus and system, and a model training method and a storage medium thereof.

BACKGROUND

Some multi-functional fitting mirrors may provide a fitting effect in the case that a user does not actually try on clothes, which improves the convenience of fitting and saves the fitting time. Before the fitting mirror is used, a three-dimensional image of a target object (in general, a user who uses the fitting mirror) needs to be acquired. The three-dimensional image is usually obtained by three-dimensionally reconstructing target images containing the target object acquired by a camera at various shooting angles.

SUMMARY

Various embodiments of the present disclosure provide a three-dimensional reconstruction method. The method includes:

acquiring first images captured by a first camera, each of the first images being an image containing a target object;

determining a shooting angle of the each of the first images, the shooting angle being configured to characterize a shooting direction relative to the target object when the first camera shoots the first images;

determining an angle interval corresponding to the each of the first images from a plurality of angle intervals included in an angle range [0, 360°) based on the shooting angle, and setting the first image as a target image in the angle interval; and three-dimensionally reconstructing the target object based on the target images in the respective angle intervals to obtain a three-dimensional image of the target object.

Optionally, determining the shooting angle of the each of the first images includes:

inputting the first image into an angle recognition model;

receiving angle information outputted by the angle recognition model; and determining the angle information as the shooting angle;

wherein the angle recognition model is a model obtained by learning and training sample images and shooting angles of the sample images.

Optionally, after acquiring the first images captured by the first camera, the method further includes:

assigning a tag to the each of the first images, the tag being configured to mark the target object in the target image; and classifying the first images containing the target object into an image set based on the tag.

prior to three-dimensionally reconstructing the target object based on the target images in the respective angle intervals to obtain the three-dimensional image of the target object, the method further includes:

acquiring the first images corresponding to the respective angle intervals based on the image set.

Optionally, after determining the angle interval corresponding to the each of the first images from the plurality of angle intervals included in the angle range [0, 360°) based on the shooting angle, the method further includes:

identifying, for each of the plurality of angle intervals, whether the image set includes a plurality of first images corresponding to the angle interval;

quality-scoring the plurality of first images to obtain an image quality score of the each of the first images in the plurality of first images, in response to identifying that the image set includes the plurality of first images corresponding to the angle interval; and reserving the first image with the highest image quality score, and deleting the remaining first images.

Optionally, after acquiring the first images captured by the first camera, the method further includes:

identifying whether a resolution of the each of the first images is less than a resolution threshold;

deleting the first image in response to identifying that the resolution of the first image is less than the resolution threshold; and modifying the first image as an image with a specified resolution in response to identifying that the resolution of the first image is not less than the resolution threshold, wherein the specified resolution is greater than or equal to the resolution threshold.

Optionally, three-dimensionally reconstructing the target object based on the target images in the respective angle intervals to obtain the three-dimensional image of the target object includes:

three-dimensionally reconstructing, when the each of the plurality of angle intervals is provided with a corresponding target image, the target object based on the target image in each of the angle intervals to obtain a three-dimensional image of the target object.

Optionally, three-dimensionally reconstructing the target object based on the target images in the respective angle intervals to obtain the three-dimensional image of the target object includes:

acquiring, when the three-dimensional reconstruction instruction is received, a plurality of first images containing the target object based on information of the target object carried by a three-dimensional reconstruction instruction;

three-dimensionally reconstructing the target object based on the each of the first images to obtain a three-dimensional image of the target object;

identifying whether the three-dimensional image is an incomplete three-dimensional image; and repairing the incomplete three-dimensional image in response to identifying that the three-dimensional image is the incomplete three-dimensional image to obtain a repaired three-dimensional image.

A plurality of embodiments of the present disclosure provides a three-dimensional reconstruction apparatus. The apparatus includes:

a first acquiring module, configured to acquire first images captured by a first camera, each of the first images containing a target object;

a first determining module, configured to determine a shooting angle of the each of the first images by using an angle recognition model, the shooting angle being configured to characterize a shooting direction relative to the target object when the first camera shoots the first images, and the angle recognition model being a model obtained by learning and training sample images and shooting angles of the sample images;

a second determining module, configured to determine an angle interval corresponding to the each of the first images from a plurality of angle intervals included in an angle range [0, 360°) based on the shooting angle of the first image, and set the first image as a target image in the angle interval; and a three-dimensional reconstructing module, configured to three-dimensionally reconstruct the target object based on the target images in the respective angle intervals to obtain a three-dimensional image of the target object.

Various embodiments of the present disclosure provide a three-dimensional reconstruction system. The system includes a reconstruction server and a first camera, wherein the reconstruction server includes the above-mentioned three-dimensional reconstruction apparatus.

Optionally, the system further includes a fitting mirror, wherein the fitting mirror is configured to, when a target object is detected, send an acquisition request to the reconstruction server, the acquisition request carrying information of the target object; and the reconstruction server is configured to send an acquisition response to the fitting mirror based on the information of the target object, the acquisition response carrying a three-dimensional image of the target object.

Various embodiments of the present disclosure provide a model training method, configured to train an angle recognition model. The method includes:

training a plurality of times until the accuracy of classifying shooting angles of sample images in a training image set by the angle recognition model reaches a predetermined threshold, wherein the training includes:

acquiring sample images containing a sample object captured by a second camera and a depth map corresponding to each of the sample images;

acquiring a first key point and a second key point of the sample object from the depth map;

determining a shooting angle of the each of the sample images based on three-dimensional coordinates of the first key point and three-dimensional coordinates of the second key point, the shooting angle being configured to characterize a direction relative to the sample object when the second camera shoots the sample images; and inputting the sample image into a deep learning model to obtain a predicted shooting angle of the sample image, and determining a classification accuracy of the shooting angle according to the shooting angle and the predicted shooting angle of the sample image.

Optionally, determining the shooting angle of the each of the sample images based on the three-dimensional coordinates of the first key point and the three-dimensional coordinates of the second key point includes:

calculating a shooting angle of the sample image by using an angle calculation formula, wherein the angle calculation formula is:

$$\begin{cases} V_1 = (x_2 - x_1, z_2 - z_1) \\ V_2 \times V_1 = 0 \\ \alpha = \arccos\left(\frac{V_2 \times V_Z}{\|V_2\| \times \|V_Z\|}\right) \\ \|V_2\| = \|V_Z\| = 1 \end{cases};$$

wherein the three-dimensional coordinates of the first key point are $(x_1, y_1, z_1)$, and the three-dimensional coordinates of the second key point are $(x_2, y_2, z_2)$; $V_1$ represents a vector of a connection line between the first key point and the second key point in an XZ plane in a world coordinate system; $V_2$ represents a unit vector perpendicular to $V_1$; $V_Z$ represents a unit vector parallel to the Z axis in the world coordinate system; and α represents the shooting angle.

Optionally, after determining the shooting angle of the each of the sample images based on the three-dimensional coordinates of the first key point and the three-dimensional coordinates of the second key point, the training further includes:

identifying, based on the sample image, whether an orientation posture of the sample object relative to the second camera is a back-facing orientation posture; and correcting the shooting angle by using a correction calculation formula, when the orientation posture of the sample object relative to the second camera is the back-facing orientation posture to obtain a corrected shooting angle, wherein the correction calculation formula is:

α1=α2+180°;

wherein α1 is the corrected shooting angle; and α2 is the shooting angle before correction.

Optionally, prior to determining the shooting angle of each of the sample images based on the three-dimensional coordinates of the first key point and the three-dimensional coordinates of the second key point, the training further includes:

identifying whether a distance between the first key point and the second key point is less than a distance threshold; and determining that the shooting angle of the sample image is a specified angle in response to identifying that the distance between the first key point and the second key point is less than the distance threshold, wherein the specified angle is any angle within an angle interval of a fixed range.

Various embodiments of the present disclosure provide a non-volatile computer-readable storage medium storing at least one code instruction therein, wherein the at least one code instruction, when executed by a processor, enables the processor to perform the above-mentioned three-dimensional reconstruction method.

BRIEF DESCRIPTION OF THE DRAWINGS

In order to illustrate technical solutions in embodiments of the present disclosure more clearly, a brief introduction of the drawings used in the embodiments will be provided herein. Obviously, the drawings described below are merely some embodiments of the present disclosure, a person ordinary skill in the art can also obtain other drawings according to these drawings without creative work.

DETAILED DESCRIPTION

For clearer descriptions of the objects, technical solutions and advantages of the present disclosure, embodiments of the present disclosure will be described in detail below in combination with the accompanying drawings.

Figure 1:
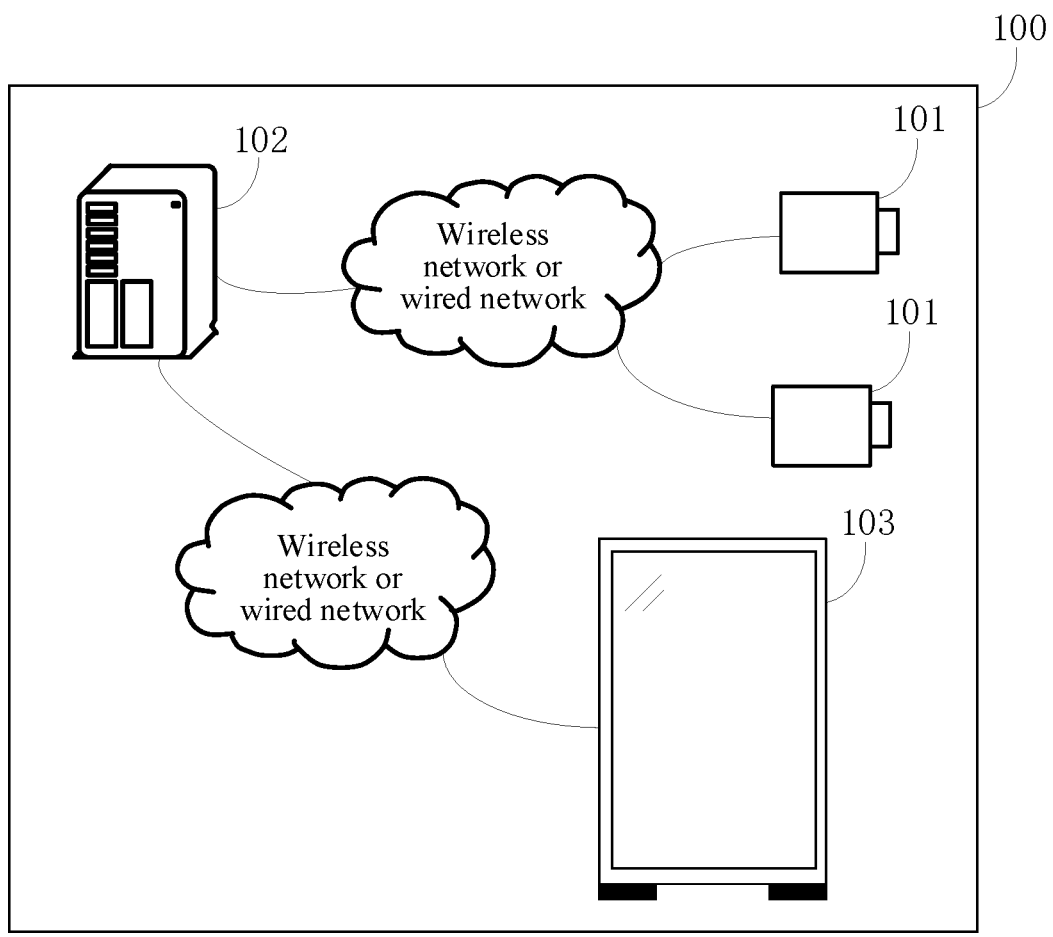
FIG. 1 is a block diagram of a three-dimensional reconstruction system involved in a three-dimensional reconstruction method according to an embodiment of the present disclosure.

Referring to FIG. 1, FIG. 1 is a block diagram of a three-dimensional reconstruction system involved in a three-dimensional reconstruction method according to an embodiment of the present disclosure. The three-dimensional reconstruction system 100 may include at least one first camera 101 and a reconstruction server 102.

The first camera 101 may generally be a surveillance camera including an RGB camera lens, an infrared camera lens or the like. In general, a plurality of first cameras 101 are provided. The plurality of first cameras 101 may be deployed at different locations in a mall or shop. The reconstruction server 102 may be a server, or a server cluster composed of several servers, or a cloud computing server center, or a computer device. Each of the first cameras 101 may establish a communication connection with the reconstruction server 102.

Optionally, the three-dimensional reconstruction system 100 may further include a fitting mirror 103. The fitting mirror 103 may generally be deployed in a store such as a clothing store. The fitting mirror 103 may provide users with a virtual fitting service. The fitting mirror 103 may establish a communication connection with the reconstruction server 102.

Figure 2:
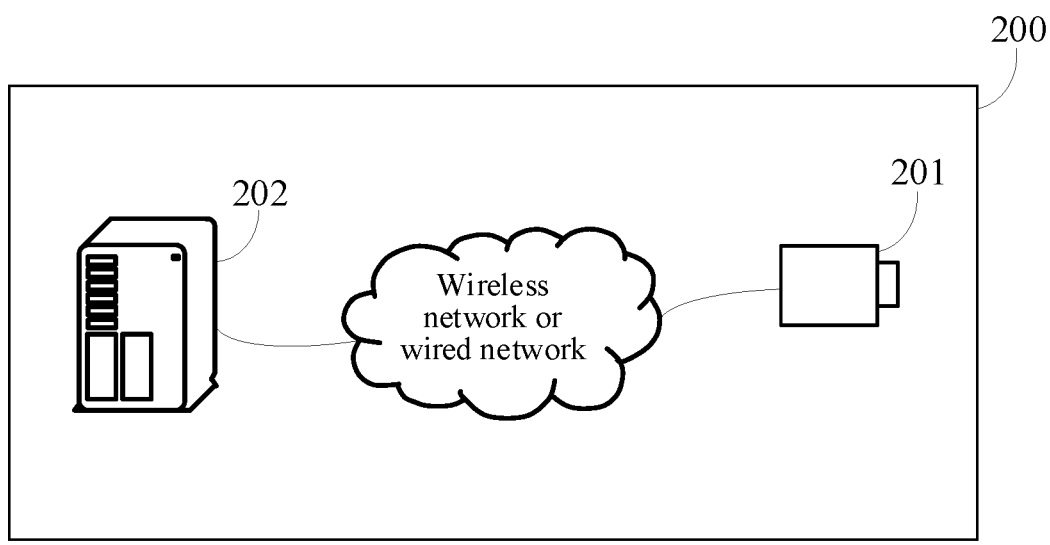
FIG. 2 is a block diagram of a model training system involved in a model training method according to an embodiment of the present disclosure.

Referring to FIG. 2, FIG. 2 is a block diagram of a model training system involved in a model training method provided by an embodiment of the present disclosure. The model training system 200 may include a second camera 201 and a training server 202.

The second camera 201 may be a camera including a depth camera lens, or may be a binocular camera. The second camera may acquire a color map (also called an RGB map) or a depth map. A pixel value of each pixel in the depth map is a depth value, wherein the depth value is used to indicate a distance of the corresponding pixel from the second camera. The training server 202 may be a server, or a server cluster composed of several servers, or a cloud computing server center, or a computer device. The second camera 201 may wiredly or wirelessly establish a communication connection with the training server 202.

Figure 3:
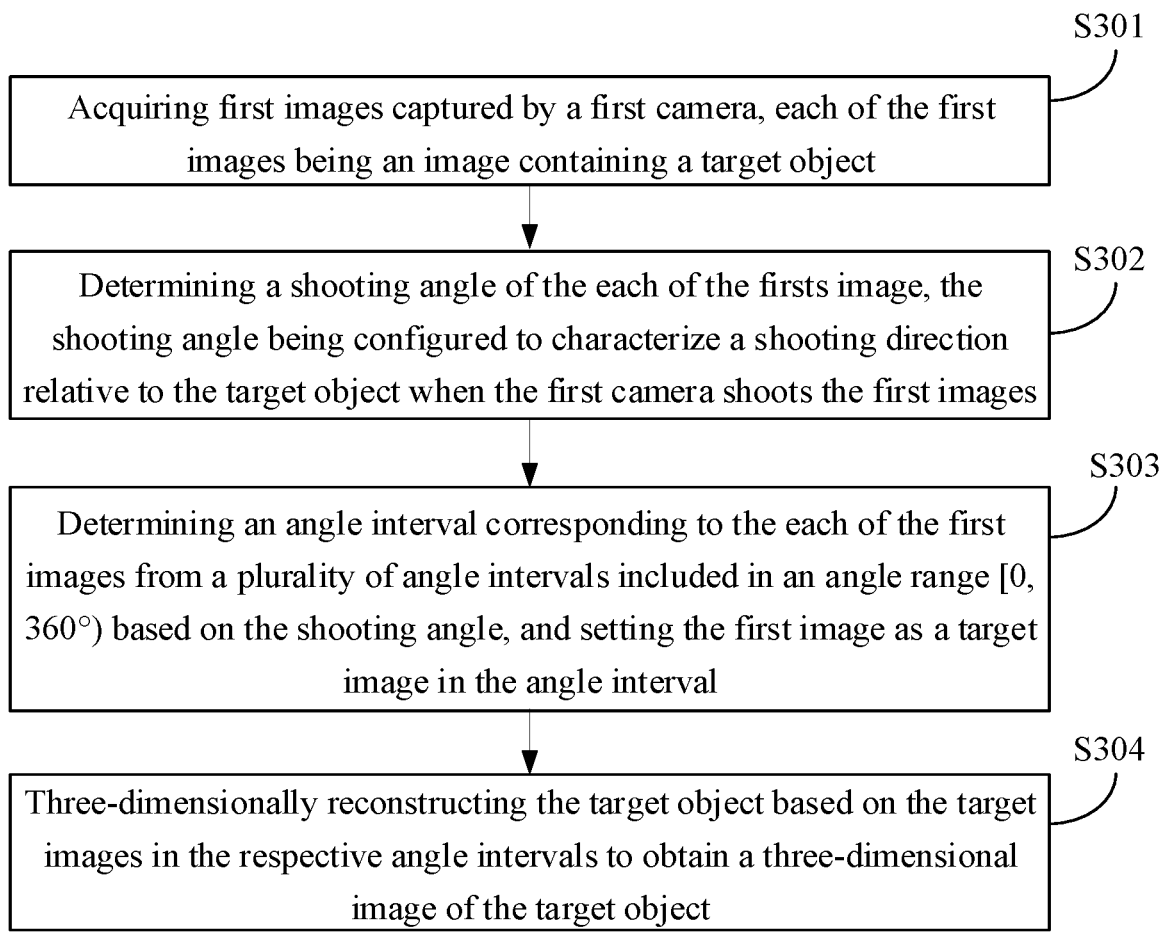
FIG. 3 is a flowchart of a three-dimensional reconstruction method according to an embodiment of the present disclosure.

Referring to FIG. 3, FIG. 3 is a flowchart of a three-dimensional reconstruction method according to an embodiment of the present disclosure. The three-dimensional reconstruction method is applicable to the reconstruction server 102 in the three-dimensional reconstruction system 100 shown in FIG. 1. The three-dimensional reconstruction method may include the following steps.

In step S301, first images captured by a first camera are acquired. Each of the first images contains a target object.

In step S302, a shooting angle of the each of the first images is determined, wherein the shooting angle is configured to characterize a shooting direction relative to the target object when the first camera shoots the first images. In some embodiments of the present disclosure, the shooting angle of each of the first images may be determined by using an angle recognition model, and the angle recognition model is a model obtained by learning and training sample images and shooting angles of the sample images.

In step S303, an angle interval corresponding to the each of the first images is determined from a plurality of angle intervals included in an angle range [0, 360°) based on the shooting angle, and the first image is set as a target image in the angle interval.

In the embodiment of the present disclosure, the plurality of angle intervals are obtained by dividing the angle range [0, 360°), and the angle value contained in the each of the angle intervals is different.

Figure 4:
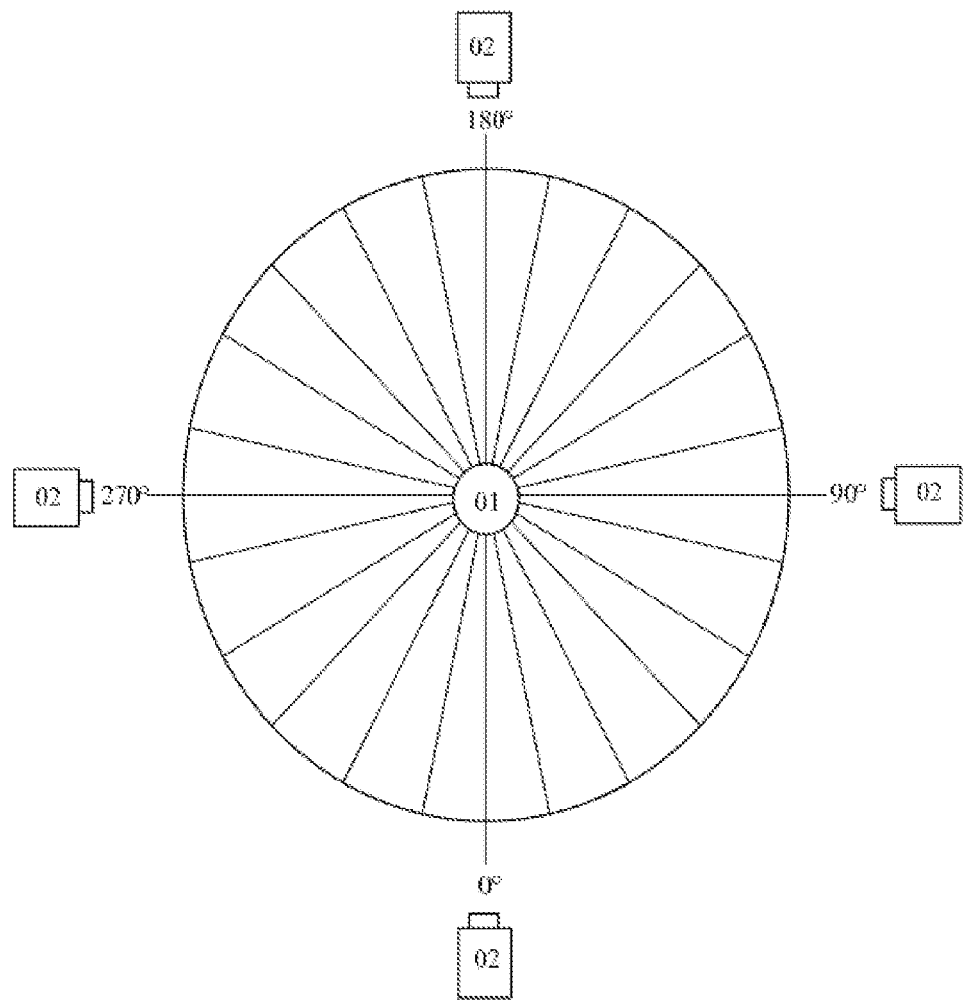
FIG. 4 is an effect diagram when a first camera shoots a target object.

Exemplarily, referring to FIG. 4, FIG. 4 is an effect diagram when the first camera shoots a target object. Taking a target object 01 as the center, a first camera 02 shoots the target object 01 from different directions. The shooting directions when the first camera 02 shoots the target object 01 may be characterized by shooting angles. For example, one angle interval is defined by counterclockwise rotation with the target object 01 as the center at an interval of 15°. Angle information included in the each of the angle intervals refers to the shooting angles obtained in step S302. Therefore, the shooting angles acquired in step S302 fall within one of the plurality of angle intervals.

In step S304, the target object is three-dimensionally reconstructed based on the target images in the respective angle intervals to obtain a three-dimensional image of the target object.

In the related art, in order to acquire a three-dimensional image of a target object, it is necessary to acquire target images containing the target object at various shooting angles by a camera lens. Since the target images acquired by the camera lens lack information about shooting angles of the target images, it is necessary to sort the target images according to a shooting order of the respective target images to ensure that two angle intervals corresponding to two adjacent images are adjacent. This method requires a large calculation amount for three-dimensional reconstruction, resulting in relatively low efficiency in acquiring a three-dimensional image.

However, in the embodiment of the present disclosure, the shooting angle of the each of the first images may be determined by the angle recognition model, and the angle interval corresponding to the each of the first images in the plurality of angle intervals may be determined based on these shooting angles. Therefore, when the first images are acquired, the shooting angles of the first images may also be acquired. In the subsequent three-dimensional reconstruction of the target object, there is no need to use additional algorithms to sort the plurality of first images, and the order of the plurality of first images may be acquired directly based on the shooting angles, thereby effectively reducing the calculation amount during three-dimensional reconstruction and improving the efficiency of acquiring the three-dimensional image.

In summary, in the three-dimensional reconstruction method according to the embodiment of the present disclosure, the shooting angle of the each of the first images can be determined by the angle recognition model. The angle interval corresponding to the each of the first images in the plurality of angle intervals can be determined based on the shooting angles, and the first images are set as the target images in the angle interval. Subsequently, the target object can be three-dimensionally reconstructed based on the target images in the respective angle intervals to obtain the three-dimensional image of the target object. The shooting angle of the each of the first images can also be acquired when the first images are acquired. In the subsequent three-dimensional reconstruction of the target object, there is no need to use additional algorithms to sort a plurality of first images, and the order of the plurality of first images may be acquired directly based on the shooting angles, thereby effectively reducing the calculation amount during three-dimensional reconstruction and improving the efficiency of acquiring the three-dimensional image.

Figure 5:
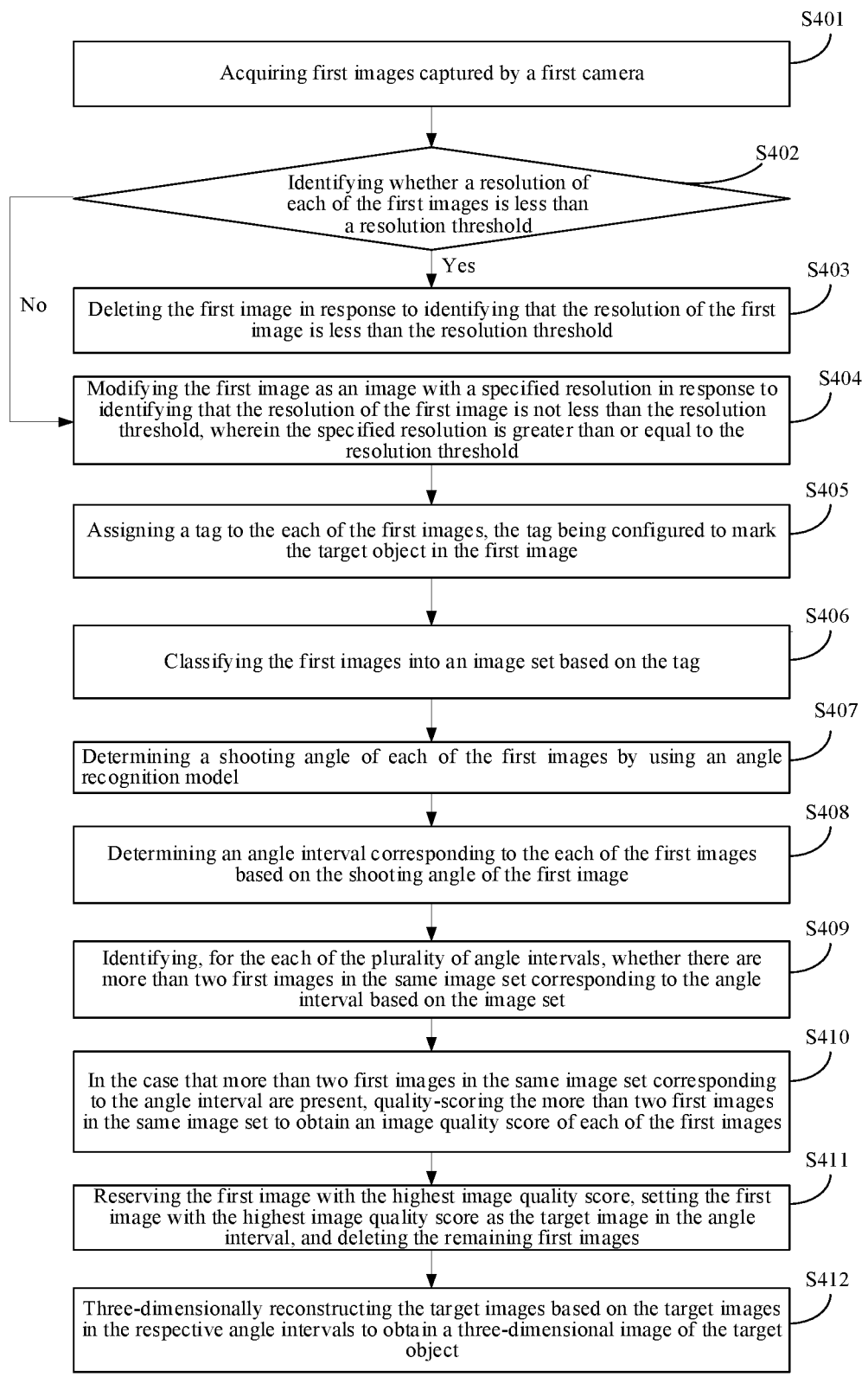
FIG. 5 is a flowchart of a three-dimensional reconstruction method according to another embodiment of the present disclosure.

Referring to FIG. 5, FIG. 5 is a flowchart of a three-dimensional reconstruction method according to another embodiment of the present disclosure. The three-dimensional reconstruction method is applicable to the reconstruction server 102 in the three-dimensional reconstruction system 100 shown in FIG. 1. The three-dimensional reconstruction method may include the following steps.

In step S401, first images captured by a first camera are acquired.

Each of the first images is an image containing a target object captured by the first camera. The target object may be a person, an animal, or an object. In the case that the first camera is a surveillance camera and is deployed in a mall or store, the target object is a person in the mall or store.

In the embodiment of the present disclosure, assuming that an image captured by the first camera contains a plurality of different target objects, the reconstruction server may intercept a plurality of first images in this image, wherein target object in the each of the first images is different.

In step S402, whether a resolution of each first image is less than a resolution threshold is identified.

Exemplarily, step S403 is performed in response to identifying that the resolution of the first image is less than the resolution threshold; and step S404 is performed in response to identifying that the resolution of the first image is not less than the resolution threshold. For example, the resolution threshold is 224×112.

In step S403, the first image is deleted in response to identifying that the resolution of the first image is less than the resolution threshold.

In some embodiments of the present disclosure, in response to identifying that the resolution of the acquired first image is relatively low, a display effect of a three-dimensional image obtained after subsequent three-dimensional reconstruction is relatively poor. Therefore, the first images with relatively low resolutions may be deleted before the three-dimensional reconstruction. Exemplarily, the reconstruction server may identify whether the resolution of the each of the first images is less than the resolution threshold. The first image is deleted in response to identifying that the reconstruction server identifies that the resolution of the first image is less than the resolution threshold.

In step S404, the first image is modified as an image with a specified resolution in response to identifying that the resolution of the first image is not less than the resolution threshold. The specified resolution is greater than or equal to the resolution threshold.

In some embodiments of the present disclosure, in response to identifying that the resolution of the first image is not less than the resolution threshold, the first image may be modified as an image with a specified resolution to facilitate subsequent three-dimensional reconstruction. Exemplarily, in response to identifying that the resolution of the first image is greater than the specified resolution, the reconstruction server needs to compress the resolution of the first image to the specified resolution; and in response to identifying that the resolution of the first image is less than the specified resolution, the reconstruction server needs to expand the resolution of the first image to the specified resolution.

In step S405, a tag is assigned to the each of the first images, wherein the tag is configured to mark a target object in the first image.

For example, the first images may be marked by using a target recognition algorithm. In some embodiments of the present disclosure, assuming that the first camera is deployed in a store or mall and the target object is a person in the store or mall, the target recognition algorithm may be a pedestrian movement route detection algorithm. The reconstruction server may mark the each of the first images with a tag by the pedestrian movement route detection algorithm, wherein the tag is configured to mark the target object in the first image. Exemplarily, the pedestrian movement route detection algorithm may be used to analyze at least one of a clothing feature, a face feature, and a morphological feature of the target object, so as to mark the each of the first image with a tag.

In step S406, the first images are classified into an image set based on the tag.

In the embodiment of the present disclosure, the first images are provided with the same tag, and contain the same target object. Therefore, the reconstruction server may classify the target images containing the same target object into an image set based on the tag.

It should be noted that, after the first images are classified in step S406, the target objects in the first images in the same image set are the same, but the target objects in the first images in different image sets are different.

In step S407, a shooting angle of the each of the first images is determined by using an angle recognition model.

In the embodiment of the present disclosure, the reconstruction server may determine the shooting angle of the each of the first images by using the angle recognition model. The angle recognition model is a model obtained by learning and training sample images and shooting angles of the sample images. A method for acquiring the angle recognition model will be introduced in the subsequent embodiments, and is not repeated here.

Exemplarily, determining the shooting angle of the each of the first images through the reconstruction server by using the angle recognition model may include the following steps.

In step A1, the first image is inputted into the angle recognition model.

In step B1, angle information outputted by the angle recognition model is received.

In step C1, the angle information is determined as the shooting angle of the first image.

In step S408, an angle interval corresponding to the each of the first images is determined based on the shooting angle of the first image. The angle interval refers to an angle interval among a plurality of angle intervals included in an angle range [0, 360°), and the first image is determined as a target image in the angle interval.

In the embodiment of the present disclosure, assuming that the first camera is arranged in a store or mall, and the target object is a person in the store or mall, the reconstruction server may acquire the first images containing the target object captured by the first camera at different shooting angles in real time during the walking process of the target object. Exemplarily, taking the target object as the center, one angle interval is defined by clockwise or counterclockwise rotation at an interval of 15°. The number of the plurality of angle intervals is 24. The reconstruction server may determine the angle interval corresponding to the first image from a plurality of angle intervals based on the shooting angle of the each of the first images, and set the first image as a target image in the angle interval. For example, assuming that the shooting angle of the first image is 10°, the angle interval corresponding to the first image is [0, 15°), and the first image is set as a target image within an angle interval of [0, 15°). The target images are used for three-dimensional reconstruction.

In step S409, for the each of the plurality of angle intervals, whether there are more than two first images in the same image set corresponding to the angle interval is identified based on the image set.

In the embodiment of the present disclosure, since the reconstruction server subsequently needs to three-dimensionally reconstruct the target object by reference to the target image corresponding to each of the angle intervals, more than two target images containing the same target object corresponding to one angle interval may be present. In response to three-dimensionally reconstructing the target object directly by reference to a plurality of first images corresponding to the angle interval and containing the same target object, the efficiency of three-dimensionally reconstructing the target object may be affected. Therefore, the reconstruction server may identify whether more than two target images are present in the same image set corresponding to one angle interval based on the image set, i.e., identifying whether more than two target images containing the same target object corresponding to one angle interval are present.

In some embodiments in the present disclosure, for each of the angle intervals, the reconstruction server may identify whether there are more than two target images corresponding to the angle interval in the same image set. In the case that more than two target images are present in the same image set corresponding to the angle interval, that is, more than two target images containing the same target object corresponding to the angle interval are present, step S410 is performed; in the case that no more than two target images are present in the same image set corresponding to the angle interval, step S409 is repeated.

In step S410, in the case that more than two first images are present in the same image set corresponding to the angle interval, more than two first images in in the same image set quantity-scored to obtain an image quality score of the each of the first images.

Exemplarily, in the case that more than two first images are present in the same image set corresponding to the angle interval, the reconstruction server may quality-score more than two first image corresponding to the angle interval by using an image quality scoring algorithm to obtain a quality score of the each of the first images.

In step S411, the first image with a highest image quality score is reserved and set as the target image in the angle interval, and the remaining first images are deleted.

In the embodiment of the present disclosure, a higher quality score indicates a higher definition of the first image. The first image is set as the target image in the corresponding angle interval, and the quality of the three-dimensional image obtained during subsequent three-dimensional reconstruction based on the target image is better. Therefore, the reconstruction server may reserve the first image with the highest image quality score, and delete the remaining first images, so as to ensure that each of the angle intervals corresponds to only one first image with relatively higher definition, thereby effectively improving the imaging quality of the three-dimensional image obtained by the subsequent three-dimensional reconstruction of the target object, reducing the number of the first images that needs to be processed during the three-dimensional reconstruction, and thus improving the efficiency of the three-dimensional reconstruction of the target object.

In step S412, the target images are three-dimensionally reconstructed based on the target images in the respective angle intervals to obtain a three-dimensional image of the target object.

It should be noted that the first images containing the same target object belong to the same image set. Therefore, prior to step S412, the three-dimensional reconstruction method may further include: acquiring first images corresponding to the respective angle intervals and containing the same target object based on the image set. It should also be noted that, after obtaining the three-dimensional image of the target object, the reconstruction server may store the three-dimensional image in a memory of the reconstruction server.

In the embodiment of the present disclosure, the reconstruction server may three-dimensionally reconstruct the target object that meets three-dimensional reconstruction conditions. There are various conditions for the three-dimensional reconstruction. The embodiments of the present disclosure are schematically illustrated in the following two optional examples.

In the first optional example, when the reconstruction server determines the target images corresponding to each of the plurality of angle intervals, the target object meets the three-dimensional reconstruction conditions.

In this case, step S412 may include: in the case that each of the plurality of angle intervals is provided with a target object, the target object is three-dimensionally reconstructed based on the target image in the each of the angle intervals to obtain a three-dimensional image of the target object. Exemplarily, the reconstruction server may three-dimensionally reconstruct the target object by using a structure from motion (SFM) algorithm to obtain a three-dimensional image of the target object.

In the embodiment of the present disclosure, the process of the reconstruction server to determine that the target images containing the same target object correspond to each of the plurality of angle intervals may include the following steps.

In step A2, for each image set, the angle interval corresponding to the each of the first images in the image set is acquired.

In the embodiment of the present disclosure, after steps S401 to S411, the reconstruction server may determine the angle interval corresponding to the each of the first images in each image set. In addition, in the same image set, the each of the angle intervals corresponds to only one first image, and this first image is set as a target image in this angle interval. Therefore, for each image set, the reconstruction server may acquire the angle interval corresponding to the each of the first images in the image set in real time.

In step B2, whether the number of angle intervals corresponding to all target images is the same as the number of the plurality of angle intervals is identified.

Exemplarily, the reconstruction server may determine that each of the plurality of angle intervals is provided with a target image in response to identifying that the number of the angle intervals corresponding to all target images is the same as the number of the plurality of angle intervals, that is, step C2 is performed. The reconstruction server may determine that at least one of the plurality of angle intervals is not provided with a target image in response to identifying that the number of angle intervals corresponding to all target images is different from the number of plurality of angle intervals, that is, step A1 is repeated.

In step C2, it is determined that each of the plurality of angle intervals is provided with the target image in the case that the number of all target images is the same as the number of the plurality of angle intervals.

In the embodiment of the present disclosure, after determining that each of the plurality of angle intervals is provided with the target image, the reconstruction server may determine that the target object is provided with target images in each of the plurality of angle intervals, wherein the target object meets the three-dimensional reconstruction conditions.

In the second optional implementation, when the reconstruction server receives a three-dimensional reconstruction instruction carrying information of the target object, the target object meets the three-dimensional reconstruction conditions.

In this case, step S412 may include the following steps.

In step A3, a plurality of first images containing the target object are acquired based on the information of the target object carried by the three-dimensional reconstruction instruction when the three-dimensional reconstruction instruction is received.

Exemplarily, the three-dimensional reconstruction system may further include a fitting mirror. The three-dimensional reconstruction instruction may be an instruction sent by the fitting mirror. In the embodiment of the present disclosure, when the reconstruction server receives the three-dimensional reconstruction instruction carrying the information of the target object, the reconstruction server may acquire a plurality of first images containing the target object based on the information of the target object.

For example, the information about the target object may include at least one of a clothing feature, a face feature, and a morphological feature. Since the three-dimensional reconstruction server may also analyze at least one of the clothing feature, the face feature, and the morphological feature of the target image after acquiring the first images, the reconstruction server may acquire the plurality of first images containing the target object based on the information of the target object.

In step B3, based on the each of the first images, the target object corresponding to this first image is three-dimensionally reconstructed to obtain a three-dimensional image of the target object. Based on the plurality of first images, angle intervals corresponding to the plurality of first images are determined, and the plurality of first images are determined as target images in the corresponding angle intervals, respectively.

Based on the target images of the corresponding angle intervals, the target images are three-dimensionally reconstructed obtain a three-dimensional image of the target object.

Exemplarily, the reconstruction server may three-dimensionally reconstruct the target object based on the each of the first images containing the target object by using the SFM algorithm to obtain a three-dimensional image of the target object.

In step C3, whether the three-dimensional image is an incomplete three-dimensional image is identified.

In the embodiment of the present disclosure, in view of a small number of the first images based on the reconstruction server during the three-dimensional reconstruction of the target object, that is, a possibility that at least one of the plurality of angle intervals is not provided with the first images containing the target object, the three-dimensional image obtained after three-dimensional reconstruction may be an incomplete three-dimensional image, for example, the three-dimensional image contains angle of voids. The reconstruction server may identify whether the three-dimensional image is an incomplete three-dimensional image. Step D3 is performed in response to identifying that the three-dimensional image is the incomplete three-dimensional image; and this process ends in response to identifying that the three-dimensional image is a complete three-dimensional image.

In step D3, the incomplete three-dimensional image is repaired to obtain a repaired three-dimensional image in response to identifying that the three-dimensional image is an incomplete three-dimensional image.

In the embodiment of the present disclosure, in order to be able to acquire a three-dimensional image with a relatively high image quality, the reconstruction server, after identifying that the three-dimensional image is the incomplete three-dimensional image, needs to repair the incomplete three-dimensional image to obtain a repaired three-dimensional image. For example, assuming that a target object to be reconstructed is a human-like target object, the reconstruction server may repair the three-dimensional image according to the law of a three-dimensional image of the human body.

It should be noted that the sequence of the steps of the three-dimensional reconstruction method provided by the embodiment of the present disclosure may be appropriately adjusted. For example, step 407 may be performed first, followed by step 405 to step 406. The steps may also be deleted or added according to the situation. Within the technical scope disclosed in the present disclosure, any variations of the method easily derived by a person skilled in the art shall fall within the protection scope of the present disclosure, which is not repeated herein.

In summary, in the three-dimensional reconstruction method according to the embodiment of the present disclosure, the shooting angle of each of the target images can be determined by the angle recognition model. The angle interval of the each of the first images can be determined from the plurality of angle intervals based on the shooting angles, and the first images are set as the target images in this angle interval. Subsequently, the target object can be three-dimensionally reconstructed based on the target images in respective angle intervals to obtain the three-dimensional image of the target object. When the first images are acquired, the shooting angle of the each of the first images can also be acquired. In the subsequent three-dimensional reconstruction of the target object, there is no need to use additional algorithms to sort a plurality of target images, and the order of the plurality of first images can be acquired directly based on the shooting angles, thereby effectively reducing the calculation amount during three-dimensional reconstruction and improving the efficiency of acquiring the three-dimensional image.

Figure 6:
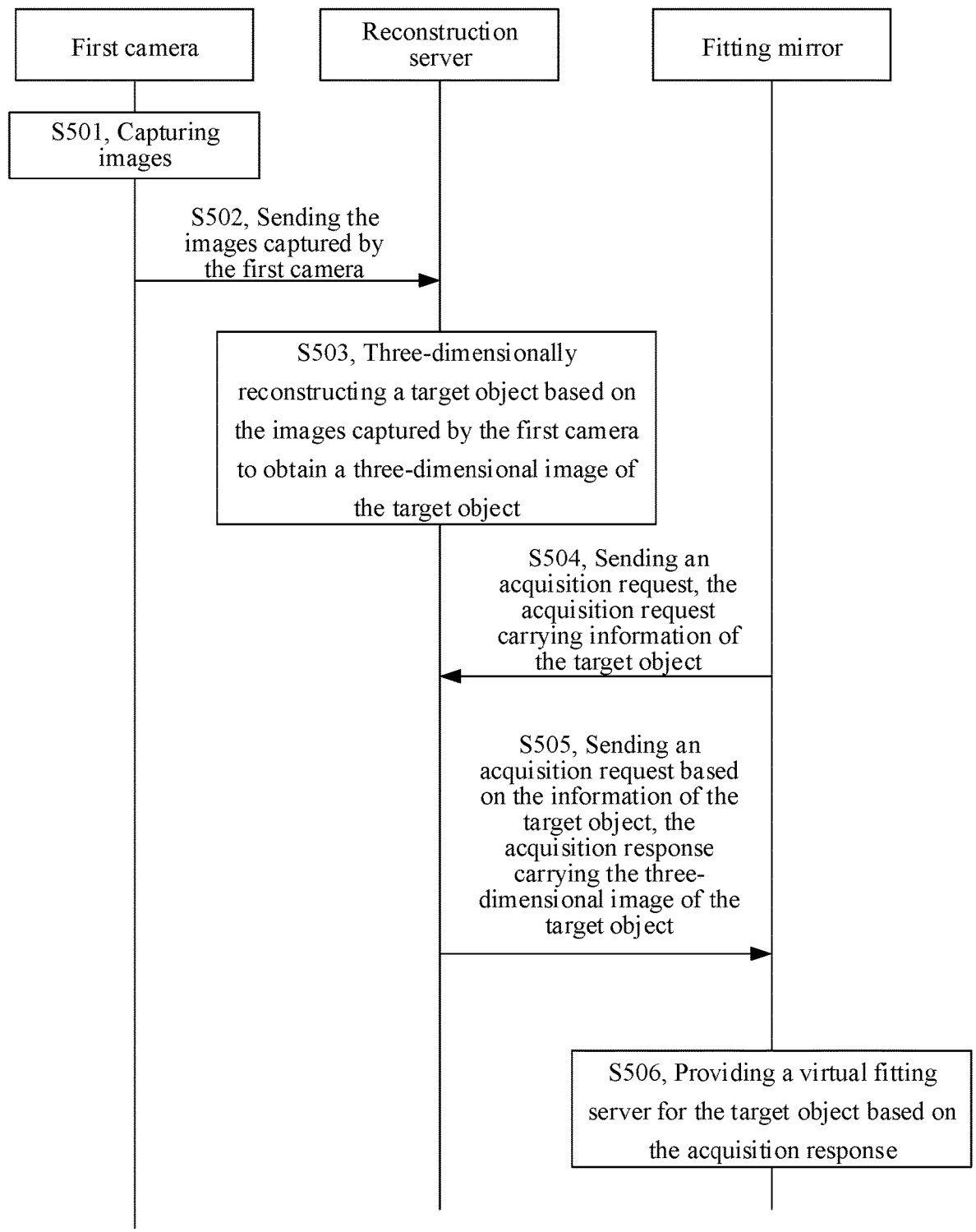
FIG. 6 is a flowchart of a three-dimensional reconstruction method according to yet another embodiment of the present disclosure.

Referring to FIG. 6, FIG. 6 is a flowchart of a three-dimensional reconstruction method according to yet another embodiment of the present disclosure. The three-dimensional reconstruction method is applicable to the three-dimensional reconstruction system 100 shown in FIG. 1. The three-dimensional reconstruction method may include the following steps.

In step S501, a first camera captures images.

In the embodiment of the present disclosure, the first camera may be a surveillance camera. A plurality of first cameras may be provided and deployed at different locations in a mall or a store.

In step S502, each of the first cameras sends the captured images to a reconstruction server.

In the embodiment of the present disclosure, the each of the first cameras may send the real-time captured images to the reconstruction server, such that the reconstruction server may three-dimensionally reconstruct a target object.

In step S503, the reconstruction server three-dimensionally reconstructs the target object based on the images captured by the first cameras to obtain a three-dimensional image of the target object.

It should be noted that the process of the reconstruction server to three-dimensionally reconstruct the target object based on the images captured by the first cameras to obtain the three-dimensional image of the target object may refer to the relevant content in steps S401 to 412, which is not repeated herein.

In step S504, a fitting mirror sends an acquisition request to the reconstruction server, the acquisition request carrying information of the target object.

In the embodiment of the present disclosure, it is assumed that the target object is a person standing in front of the fitting mirror. In order to provide a virtual fitting service for the target object, the fitting mirror needs to acquire the three-dimensional image of the target object from the reconstruction server.

Exemplarily, a fitting mirror camera may be provided in the fitting mirror. The fitting mirror camera may capture information of the target object located in front of the fitting mirror, and send an acquisition request to the reconstruction server, the acquisition request carrying the information of the target object.

In step S505, the reconstruction server sends an acquisition response to the fitting mirror based on the information of the target object, the acquisition response carrying the three-dimensional image of the target object.

In some embodiments of the present disclosure, the reconstruction server, after receiving the acquisition request that carries the information of the target object, may first identify, based on the information of the target object, whether the three-dimensional image of the target object is stored.

In some embodiments of the present disclosure, the information of the target object may be face information. The reconstruction server may also acquire the face information of the target object in the event of acquiring the three-dimensional image of the target object. Therefore, the reconstruction server may identify, based on the face information, whether the three-dimensional image of the target object is stored.

In response to identifying that the three-dimensional image of the target object is stored, for example, in the case that the face information of the target object carried in the acquisition request is identical with the face information corresponding to the three-dimensional image stored by the reconstruction server, the reconstruction server may determine that the three-dimensional image of the target object is stored. In this case, the reconstruction server may send an acquisition response carrying the three-dimensional image of the target object to the fitting mirror.

In response to identifying that the three-dimensional image of the target object is not stored, for example, the face information corresponding to all three-dimensional images stored in the reconstruction server is not identical with the face information of the target object carried in the acquisition request, the reconstruction server may determine that it does not store the three-dimensional image of the target object. In this case, the reconstruction server may send a response to the fitting mirror, the response indicating that the three-dimensional image of the target object is not stored in the reconstruction server. The fitting mirror may send a three-dimensional reconstruction instruction carrying information of the target object to the reconstruction server based on the acquisition response. The reconstruction server may three-dimensionally reconstruct the target object based on the three-dimensional reconstruction instruction, and then send an acquisition response carrying the three-dimensional image of the target object to the fitting mirror. Based on the three-dimensional reconstruction instruction, the process of the reconstruction server for three-dimensionally reconstructing the target object may refer to the corresponding process in step S412, which is not repeated herein.

In step S506, the fitting mirror provides a virtual fitting service to the target object based on the acquisition response.

In the embodiment of the present disclosure, after receiving the acquisition response carrying the three-dimensional image of the target object sent by the reconstruction server, the fitting mirror may provide a virtual fitting service to the target object based on the acquisition response.

It should be noted that the image quality of the three-dimensional image of the target object carried in the acquisition response may be relatively poor. For example, when the reconstruction server acquires a three-dimensional image based on a small number of images containing the target object, the image quality of the three-dimensional image acquired by the reconstruction server is relatively poor. Therefore, the fitting mirror may analyze the image quality of the three-dimensional image of the target object carried in the acquisition response, to determine whether to affect the virtual fitting service provided to the target object. In the case that the virtual fitting service to the target object is affected, the fitting mirror will send out a voice message prompting the target object to rotate in a circle. In this case, after the target object rotates, images of the target object may be captured again at different shooting angles by the fitting mirror camera. The reconstruction server may three-dimensionally reconstruct the target object again based on each image. In this case, the imaging quality of the three-dimensional image of the target object is relatively high.

In related arts, it is usually necessary for the user to rotate by a circle in front of the fitting mirror in the event of using the fitting mirror, such that the camera installed in the dressing mirror captures images containing the user from different shooting angles, and then three-dimensionally reconstructs the image to obtain a three-dimensional image of the user. Therefore, acquisition of the three-dimensional image by three-dimensional reconstruction takes long when the user uses the fitting mirror.

However, in the embodiment of the present disclosure, the first cameras are arranged in a store or mall. The reconstruction server may acquire images of the user captured by the first cameras from different shooting angles in real time, directly three-dimensionally reconstruct the images after three-dimensional reconstruction conditions are satisfied, and then send the obtained three-dimensional image to the fitting mirror. It is unnecessary for the user to rotate by a circle in front of the fitting mirror when the user uses the fitting mirror. In addition, the three-dimensional image of the user can be acquired directly, without waiting for three-dimensional reconstruction to obtain the three-dimensional image, thereby improving the user experience.

It should be noted that the sequence of the steps of the three-dimensional reconstruction method provided by the embodiment of the present disclosure may be appropriately adjusted, and the steps may also be deleted or added according to the situation. Within the technical scope disclosed in the present disclosure, any variations of the method easily derived by a person skilled in the art shall fall within the protection scope of the present disclosure, which is not repeated herein.

In summary, in the three-dimensional reconstruction method according to the embodiment of the present disclosure, the shooting angle of each of the images can be determined by the angle recognition model. The angle interval corresponding to the each of the images may be determined from the plurality of angle intervals based on the shooting angles. Subsequently, the target object can be three-dimensionally reconstructed based on the images corresponding to the respective angle intervals and containing the same target object to obtain a three-dimensional image of the target object. The shooting angles of images can also be acquired in the event of acquiring the images. In the subsequent three-dimensional reconstruction of the target object, there is no need to use additional algorithms to sort a plurality of first images, and the order of the plurality of first images may be acquired directly based on the shooting angles, thereby effectively reducing the calculation amount during three-dimensional reconstruction and improving the efficiency of acquiring the three-dimensional image. In addition, it is unnecessary for the user to rotate by a circle in front of the fitting mirror when the user uses the fitting mirror. Further, the three-dimensional image of the user may be acquired directly, without waiting for three-dimensional reconstruction to obtain the three-dimensional image, thereby improving the user experience.

An embodiment of the present disclosure also provides a model training method, which is used to train the angle recognition model used in the three-dimensional reconstruction method shown in FIG. 3, FIG. 5, or FIG. 6. This model training method is applied to the training server 202 in the model training system 200 shown in FIG. 2. The model training method may include:

training a plurality of times until the accuracy of classifying shooting angles of sample images in a training image set by the angle recognition model reaches a predetermined threshold.

Figure 7:
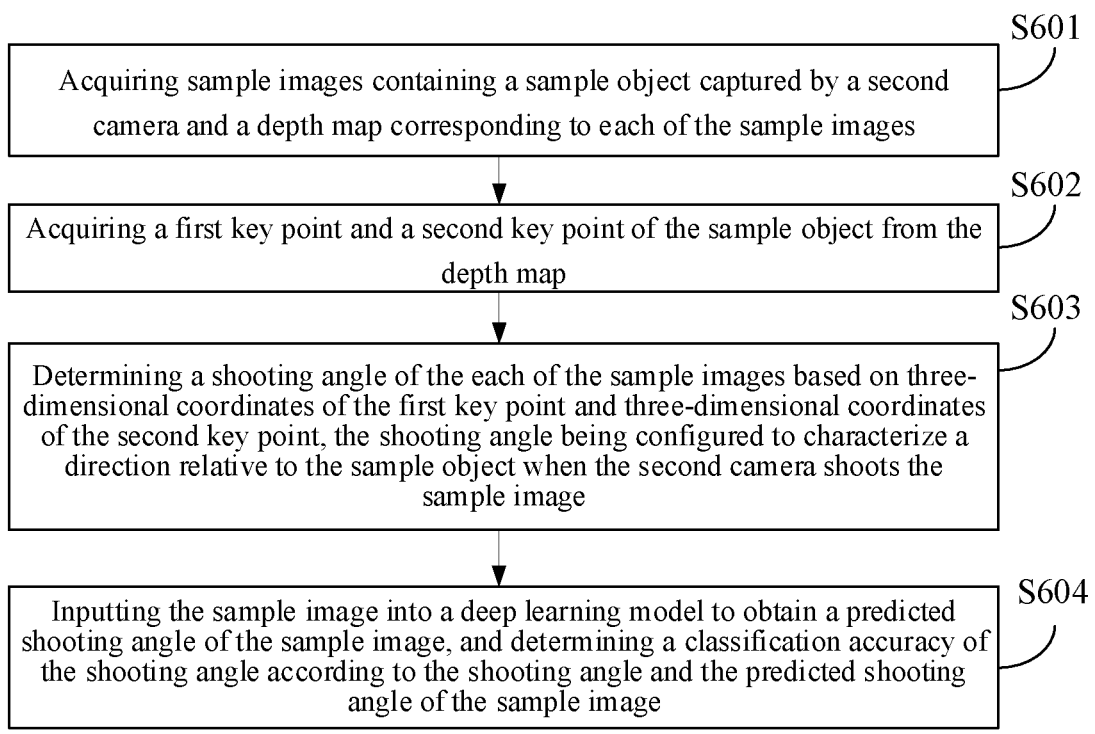
FIG. 7 is a flowchart of a training process according to an embodiment of the present disclosure.

Referring to FIG. 7, FIG. 7 is a flowchart of a training process according to at least one embodiment of the present disclosure. The training process may include the following steps.

In step S601, sample images containing a sample object captured by a second camera and a depth map corresponding to each of the sample images are acquired.

In the embodiment of the present disclosure, the sample object may be a person, an animal, or an object. The training server may use the second camera to capture sample images containing the sample object and a depth map corresponding to the each of the sample images. The second camera may be a camera including a depth camera lens, or may be a binocular camera. For example, the second camera may be a device with a depth camera lens, such as a Kinect device. It should be noted that the second camera can capture a depth map and a color map at the same time. Therefore, after the sample object is captured by the second camera, the training server can acquire the sample images containing the sample object captured by the second camera and the depth map corresponding to the each of the sample images at the same time.

It should also be noted that the color map and the depth map acquired by the second camera after shooting the sample object not only include the sample object, but also other background images before the sample object. In order to facilitate subsequent image processing, after the second camera shoots the sample object, the training server also needs to intercept the acquired depth map and color map, such that the intercepted sample images and the corresponding depth maps thereof only contain the sample object.

In step S602, a first key point and a second key point of the sample object are acquired from the depth map.

Figure 8:
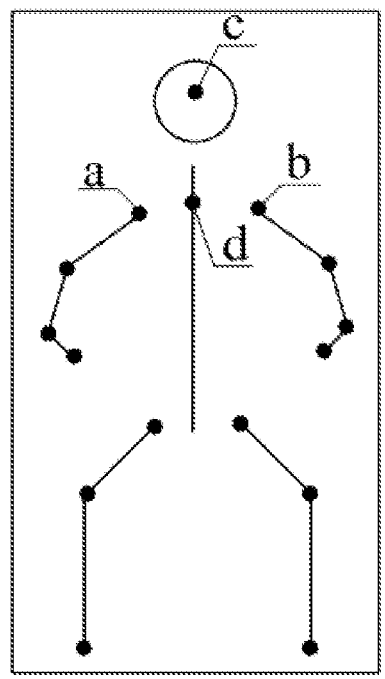
FIG. 8 is a schematic diagram of a joint point of a sample object according to an embodiment of the present disclosure.

In the embodiment of the present disclosure, in the case that the sample object is a person, the first key point and the second key point of the sample object may be two shoulder joint points of the person, respectively. It should be noted that after the Kinect device captures the depth map containing the sample object, the Kinect device may capture all joint points of the sample object. For example, as shown in FIG. 8, the Kinect device may capture 14 joint points of the sample object. At this time, the training server may acquire two shoulder joint points a and b of the sample object in the depth map.

In step S603, a shooting angle of the each of the sample images is determined based on three-dimensional coordinates of the first key point and three-dimensional coordinates of the second key point. The shooting angle is configured to characterize a direction relative to the sample object when the second camera shoots the sample images.

In the embodiment of the present disclosure, an angle between a vertical direction of a connection line between the first key point and the second key point and a Z-axis direction in a world coordinate system may be determined as the shooting angle of the sample image. The Z-axis direction in the world coordinate system is generally parallel to an optical axis direction of the second camera. A training server may determine a shooting angle of the sample image based on three-dimensional coordinates of the first key point and three-dimensional coordinates of the second key point.

The position of a key point in the depth map may be determined from X-axis and Y-axis components of three-dimensional coordinates of the key point, and a depth value of this key point may be determined from Z axis components of the three-dimensional coordinates of the key point. It should be noted that, after acquiring the sample images and the corresponding depth maps thereof, the training server may determine three-dimensional coordinates of any point in the depth map.

In some embodiments of the present disclosure, determining the shooting angle of the each of the sample images based on the three-dimensional coordinates of the first key point and the three-dimensional coordinates of the second key point may include: calculating a shooting angle of the sample image by using an angle calculation formula, wherein the angle calculation formula is:

$$\begin{cases} V_1 = (x_2 - x_1, z_2 - z_1) \\ V_2 \times V_1 = 0 \\ \alpha = \arccos\left(\frac{V_2 \times V_Z}{\|V_2\| \times \|V_Z\|}\right); \\ \|V_2\| = \|V_Z\| = 1 \end{cases}$$

wherein the three-dimensional coordinates of the first key point are $(x_1, y_1, z_1)$, and the three-dimensional coordinates of the second key point are $(x_2, y_2, z_2)$; $V_1$ represents a vector of a connection line between the first key point and the second key point in an XZ plane in a world coordinate system; $V_2$ represents a unit vector perpendicular to $V_1$; $V_Z$ represents a unit vector parallel to the Z axis in the world coordinate system; and a represents the shooting angle.

In the embodiment of the present disclosure, there are two special cases when the training server determines the shooting angle of the each of the sample images.

In the first special case, in the case that the training server determines the shooting angle of the each of the sample images only based on the three-dimensional coordinates of the first key point and the three-dimensional coordinates of the second key point, there may be two sample images with the same shooting angle but different shooting directions of the second camera. For example, the shooting angle when the second camera shoots the sample object in the current shooting direction is identical with the shooting angle when the second camera shoots the sample object after the shooting direction is rotated by 180°. Therefore, in order to distinguish two sample images with the same shooting angle but different shooting directions of the second camera, after step S603, the training process may further include the following steps.

In step A4, whether an orientation posture of each sample object relative to the second camera is a back-facing orientation posture is identified based on the sample images.

In the embodiment of the present disclosure, the training server may identify whether the orientation posture of the sample object relative to the second camera is a back-facing orientation posture or a forward orientation posture based on the sample image. When the training server identifies that the orientation posture of the sample object relative to the second camera is the back-facing orientation posture, a shooting angle of the sample object needs to be corrected, and step B4 is performed. When the training server identifies that the orientation posture of the sample object relative to the second camera is the forward orientation posture, the shooting angle of the sample object does not need to be corrected.

In step B4, the shooting angle is corrected by using a correction calculation formula, when the orientation posture of the sample object relative to the second camera is the back-facing orientation posture to obtain a corrected shooting angle. The correction calculation formula is:

$\alpha 1 = \alpha 2 + 180°$; in which, $\alpha 1$ is the corrected shooting angle; and $\alpha 2$ is the shooting angle before correction.

In the embodiment of the present disclosure, in order to distinguish two sample images with the same shooting angle but different shooting directions, the training server may correct the shooting angle of the sample images in response to identifying that the orientation posture of the sample object relative to the second camera is the back-facing orientation posture, such that shooting angles of any two sample images captured by the second camera in different shooting directions are also different.

In the second special case, in the case that the orientation posture of the sample object relative to the second camera is a lateral posture, the first key point and the second key point in the sample object are almost overlapped, such that the accuracy of the training server to determine the shooting angle of the sample image based on the three-dimensional coordinates of the first key point and the second key point are relatively low. Therefore, in order to improve the accuracy of the shooting angle of the sample image, prior to step 603, the training process may further include the following steps.

In step A5, whether a distance between the first key point and the second key point is less than a distance threshold is identified.

In some embodiments of the present disclosure, as shown in FIG. 8, it is assumed that the sample object is a person. A first key point and a second key point in the sample object may be two shoulder joint points a and b of the person, respectively, and the distance threshold may be a distance between a head joint point c and a neck joint point d. The training server may calculate a distance between the two shoulder joint points a and b in the sample object in a depth map, and compare this distance with a distance threshold (that is, the distance between the head joint point c and the neck joint point d), to identify whether the distance between the first key point and the second key point is less than the distance threshold. Step B5 is performed in response to identifying that the distance between the first key point and the second key point is less than the distance threshold. Step S603 is performed in response to identifying that the distance between the first key point and the second key point is not less than the distance threshold.

In step B5, it is determined that the shooting angle of the sample image is a specified angle in response to identifying that the distance between the first key point and the second key point is less than the distance threshold. The specified angle is any angle within an angle interval of a fixed range.

In the embodiment of the present disclosure, in response to identifying that the distance between the first key point and the second key point is less than the distance threshold, the training server may determine the shooting angle of the sample image as the specified angle.

Exemplarily, the specified angle may be 90° or 270°. In order to determine the shooting angle of the sample image more accurately, the training server needs to determine the orientation posture of the sample object relative to the second camera based on the sample image, and determine whether the shooting angle of the sample image is 90° or 270° based on the orientation posture of the sample object relative to the second camera. For example, the orientation posture of the sample object relative to the second camera may further include: a rightward orientation posture and a leftward orientation posture. When the orientation posture of the sample object relative to the second camera is the rightward orientation posture, the shooting angle of the sample image is 90°. When the orientation posture of the sample object relative to the second camera is the leftward orientation posture, the shooting angle of the sample image is 270°.

In step S604, the sample image is inputted into a deep learning model to obtain a predicted shooting angle of the sample image, and a classification accuracy of the shooting angle is determined according to the shooting angle and the predicted shooting angle of the sample image.

In the embodiment of the present disclosure, the deep learning model may learn a correspondence between the sample image and the shooting angle. After the deep learning model has completed learning the correspondence between the sample image and the shooting angle, the predicted shooting angle of the sample image can be obtained. After determining the classification accuracy of the shooting angle according to the shooting angle and the predicted shooting angle of the sample image, the training server may identify whether the classification accuracy is greater than a predetermined threshold. When the classification accuracy is greater than or equal to the predetermined threshold, the training of the sample image is ended, and a new sample image may be inputted into the deep learning model later. When the classification accuracy is less than the predetermined threshold, step S604 is repeated to input the sample image into the deep learning model again.

It should be noted that the angle recognition model may be obtained by the training process of steps S601 to S604 mentioned above for many times. In addition, the accuracy of classifying shooting angles of sample images in a training image set by the angle recognition model reaches a predetermined threshold.

Exemplarily, in the above step S604, a loss value LOSS of a loss function may be determined according to the shooting angle and the predicted shooting angle of the sample image. The loss value of the loss function may be determined by the following calculation formula:

$$\text{Loss}=\text{CE}(a,\hat{a})+\partial \cdot \text{MSE}(a,\hat{a}).$$

wherein a represents the predicted shooting angle of the sample image; â represents a real shooting angle of the sample image; CE represents a cross entropy; MSE represents a mean square error; and $\partial=0.8$ represents a fusion coefficient of the two.

Other parameters of the deep learning model are configured as follows: a resolution of the input sample image is 224×112; a used optimizer is an Adam optimizer; and the number of iterations is 50 times. One iteration means that the deep learning model learns the correspondence between the sample image and the shooting angle of the sample image once.

It should be noted that the angle recognition model used in the three-dimensional reconstruction method shown in FIG. 3, FIG. 5 or FIG. 6 may be obtained by the above steps. When a target image is inputted into the angle recognition model, the angle model may output a shooting angle of the target image.

At least one embodiment of the present disclosure provides a three-dimensional reconstruction apparatus, which includes a processor; and a memory for storing at least one program code executable by the processor. The at least one program code, when executed by the processor, enables the processor to be configured to:

acquire first images captured by a first camera, each of the first images containing a target object;

determine a shooting angle of the each of the first images by using an angle recognition model, each shooting angle being configured to characterize a shooting direction relative to the target object when the first camera shoots the first images, and the angle recognition model being a model obtained by learning and training sample images and shooting angles of the sample images;

determine an angle interval corresponding to the each of the first images from a plurality of angle intervals included in an angle range [0, 360°) based on the shooting angle of the first image, and set the first image as a target image in the angle interval; and three-dimensionally reconstructing the target object based on the target images in the respective angle interval to obtain a three-dimensional image of the target object.

Figure 9:
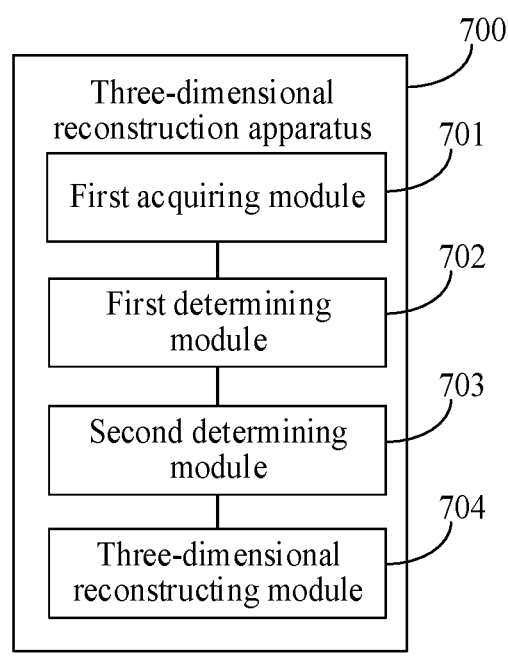
FIG. 9 is a block diagram of a three-dimensional reconstruction apparatus according to an embodiment of the present disclosure.

At least one embodiment of the present disclosure provides a three-dimensional reconstruction apparatus. FIG. 9 shows a block diagram of a three-dimensional reconstruction apparatus according to an embodiment of the present disclosure. The three-dimensional reconstruction apparatus 700 may be integrated in a reconstruction server 102 in the three-dimensional reconstruction system 100 as shown in FIG. 1. The three-dimensional reconstruction apparatus 700 may include:

a first acquiring module 701, configured to acquire target images captured by a first camera, each of the target images being an image containing a target object;

a first determining module 702, configured to determine a shooting angle of the each of the target images by using an angle recognition module, each shooting angle being configured to characterize a shooting direction when the first camera shoots the target images, and the angle recognition model being a model obtained by learning and training sample images and shooting angles of the sample images;

a second determining module 703, configured to determine an angle interval corresponding to the each of the target images from a plurality of angle intervals included in an angle range [0, 360°) based on the shooting angle; and a three-dimensional reconstructing module 704, configured to three-dimensionally reconstruct the target object based on the target images corresponding to the respective angle intervals and containing the target object to obtain a three-dimensional image of the target object.

In some embodiments of the present disclosure, the first determining module 702 is configured to input the target images into the angle recognition model; receive angle information outputted by the angle recognition model; and determine the angle information as the shooting angle.

Figure 10:
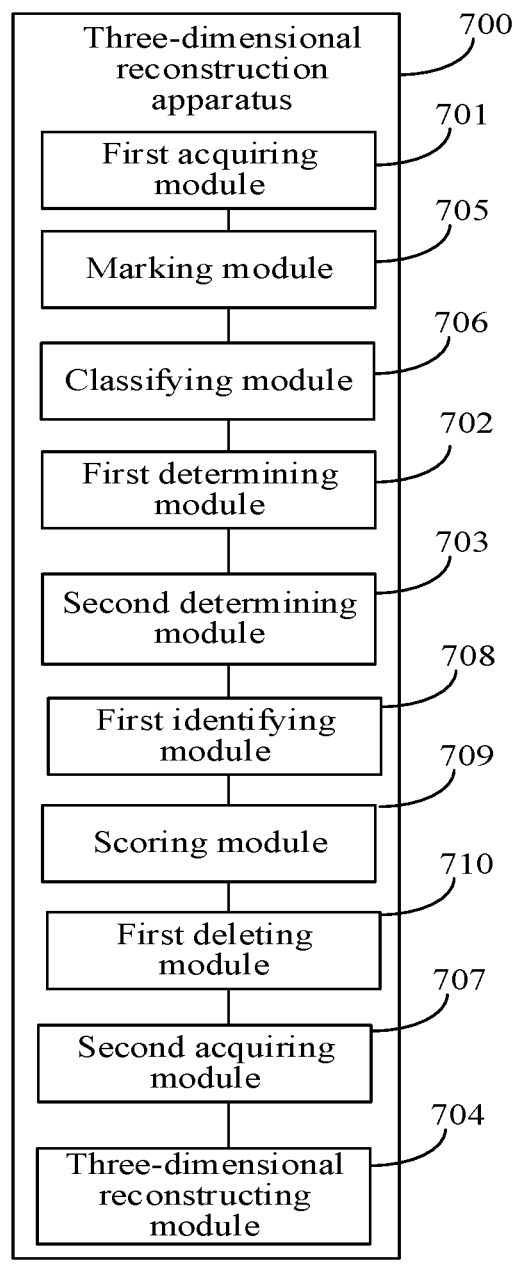
FIG. 10 is a block diagram of a three-dimensional reconstruction apparatus according to another embodiment of the present disclosure.

FIG. 10 is a block diagram of a three-dimensional reconstruction apparatus according to another embodiment of the present disclosure. The three-dimensional reconstruction apparatus 700 may further include:

a marking module 705, configured to assign a tag to each of the target images to obtain a tag of the target image, the tag being configured to mark the target object in the target image; wherein the marking module 705 marks the target image by using a target recognition algorithm;

a classifying module 706, configured to classify the target images containing the target object into an image set based on the tag of the each of the target images; and a second acquiring module 707, configured to acquire the target images corresponding to the respective angle intervals and containing the target object, based on the image set.

In some embodiments of the present disclosure, as shown in FIG. 10, the three-dimensional reconstruction apparatus 700 may further include:

a first identifying module 708, configured to identify whether the each of the angle intervals corresponds to more than two target images located in the image set based on the image set;

a scoring module 709, configured to quality-score the more than two target images located in the image set to obtain an image quality score of the each of the target images, in response to identifying that each angle interval is correspondingly provided with more than two target images in the same image set; and a first deleting module 710, configured to reserve the target image with the highest image quality score, and delete the remaining target images.

Figure 11:
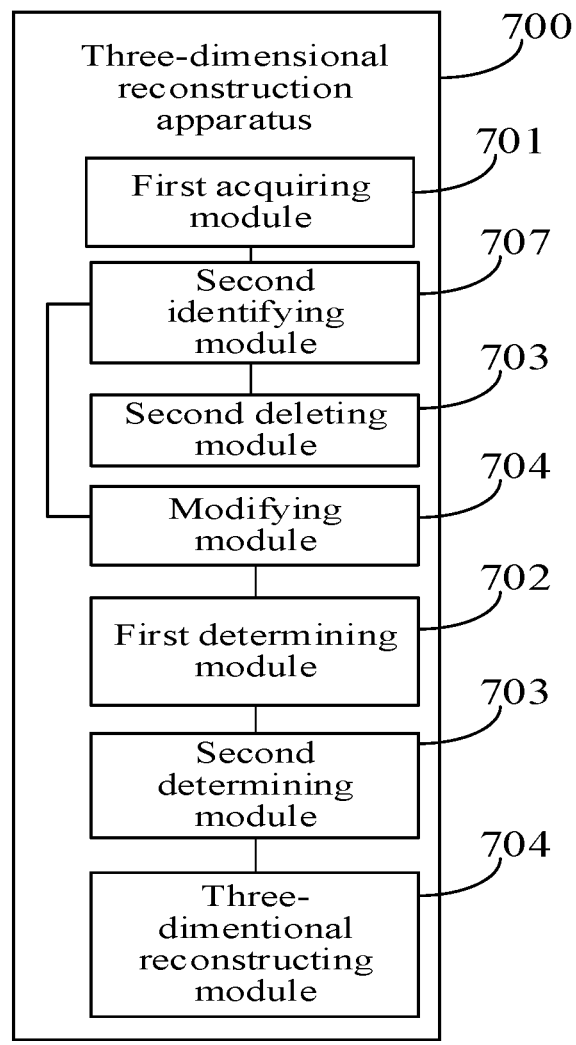
FIG. 11 is a block diagram of a three-dimensional reconstruction apparatus according to yet another embodiment of the present disclosure.

FIG. 11 is a block diagram of a three-dimensional reconstruction apparatus according to yet another embodiment of the present disclosure. The three-dimensional reconstruction apparatus 700 may further include:

a second identifying module 711, configured to identify whether a resolution of each of the target images is less than a resolution threshold;

a second deletion module 712, configured to delete the target image in response to identifying that the resolution of the target image is less than the resolution threshold; and a modification module 713, configured to modify the target image as an image with a specified resolution in response to identifying that the resolution of the target image is not less than the resolution threshold, wherein the specified resolution is greater than or equal to the resolution threshold.

In some embodiments of the present disclosure, the three-dimensional reconstruction module 704 is configured to: in response to identifying that the each of the plurality of angle intervals is provided with corresponding target image containing the target object, three-dimensionally reconstruct the target object based on the target images corresponding to the each of the angle intervals to obtain a three-dimensional image of the target object.

In some embodiments of the present disclosure, the three-dimensional reconstruction module 704 is configured to acquire a plurality of target images containing the target object to be reconstructed based on information of the target object to be reconstructed carried by a three-dimensional reconstruction instruction when the three-dimensional reconstruction instruction is received; three-dimensionally reconstructing the target object to be reconstructed based on the each of the target images containing the target object to be reconstructed to obtain a three-dimensional image of the target object to be reconstructed; identify whether the three-dimensional image is an incomplete three-dimensional image; and repair the incomplete three-dimensional image in response to identifying that the three-dimensional image is the incomplete three-dimensional image to obtain a repaired three-dimensional image.

In summary, in the three-dimensional reconstruction apparatus according to the embodiment of the present disclosure, the shooting angle of each of the target images can be determined by the angle recognition model, and the angle interval corresponding to the target image can be determined from a plurality of angle intervals based on the shooting angle. Subsequently, the target object can be three-dimensionally reconstructed based on the target images corresponding to the respective angle intervals and containing the target object to obtain the three-dimensional image of the target object. The shooting angles of the target images can also be acquired when the target images are acquired. In the subsequent three-dimensional reconstruction of the target object, it is unnecessary to use additional algorithms to sort a plurality of target images, and the order of the plurality of target images can be acquired directly based on the shooting angles, thereby effectively reducing the calculation amount during the three-dimensional reconstruction and improving the efficiency of acquiring the three-dimensional image.

An embodiment of the present disclosure further provides a model training apparatus. The model training device may be integrated in the training server 202 in the model training system 200 shown in FIG. 2. The model training apparatus is configured to train the angle recognition model used in the three-dimensional reconstruction method shown in FIG. 3, FIG. 5, or FIG. 6. The model training apparatus may include:

a training module, configured to train a plurality of times until the accuracy of classifying shooting angles of sample images in a training image set by the angle recognition model reaches a predetermined threshold. This training may include:

acquiring sample images containing a sample object captured by a second camera and a depth map corresponding to each of the sample images;

acquiring a first key point and a second key point of the sample object from the depth map;

determining a shooting angle of the each of the sample images based on three-dimensional coordinates of the first key point and three-dimensional coordinates of the second key point, the shooting angle being configured to characterize a direction relative to the sample object when the second camera shoots the sample images; and inputting the sample image into a deep learning model to obtain a predicted shooting angle of the sample image, and determining a classification accuracy of the shooting angle according to the shooting angle and the predicted shooting angle of the sample image.

In some embodiments of the present disclosure, determining the shooting angle of the each of the sample images based on the three-dimensional coordinates of the first key point and the three-dimensional coordinates of the second key point includes:

calculating a shooting angle of the sample image by using an angle calculation formula, wherein the angle calculation formula is:

$$\begin{cases} V_1 = (x_2 - x_1,\ z_2 - z_1) \\ V_2 \times V_1 = 0 \\ \alpha = \arccos\left(\dfrac{V_2 \times V_Z}{\|V_2\| \times \|V_Z\|}\right); \\ \|V_2\| = \|V_Z\| = 1 \end{cases}$$

wherein the three-dimensional coordinates of the first key point are $(x_1, y_1, z_1)$, and the three-dimensional coordinates of the second key point are $(x_2, y_2, z_2)$; $V_1$ represents a vector of a connection line between the first key point and the second key point in an XZ plane in a world coordinate system; $V_2$ represents a unit vector perpendicular to $V_1$; $V_Z$ represents a unit vector parallel to the Z axis in the world coordinate system; and a represents the shooting angle.

In some embodiments of the present disclosure, after determining the shooting angle of the each of the sample images based on the three-dimensional coordinates of the first key point and the three-dimensional coordinates of the second key point, the training process further includes:

identifying, based on the sample image, whether an orientation posture of the sample object relative to the second camera is a back-facing orientation posture; and correcting the shooting angle by using a correction calculation formula, when the orientation posture of the sample object relative to the second camera is the back-facing orientation posture to obtain a corrected shooting angle, wherein the correction calculation formula is: α1=α2+180°; in which, α1 is the corrected shooting angle; and α2 is the shooting angle before correction.

In some embodiments of the present disclosure, prior to determining the shooting angle of the each of the sample images based on the three-dimensional coordinates of the first key point and the three-dimensional coordinates of the second key point, the training process further includes:

identifying whether a distance between the first key point and the second key point is less than a distance threshold; and determining that the shooting angle of the sample image is a specified angle in response to identifying that the distance between the first key point and the second key point is less than the distance threshold, wherein the specified angle is any angle within an angle interval of a fixed range.

At least one embodiment of the present disclosure also provides a three-dimensional reconstruction system, which may include a reconstruction server and a first camera. The structure of the three-dimensional reconstruction system may refer to the structure shown in the three-dimensional reconstruction system shown in FIG. 1. The reconstruction server may include a three-dimensional reconstruction apparatus 700 shown in FIG. 9, FIG. 10 or FIG. 11.

In some embodiments of the present disclosure, the three-dimensional reconstruction system includes a fitting mirror. The fitting mirror is configured to, when a target object is detected, send an acquisition request to the reconstruction server, the acquisition request being configured to request to acquire the three-dimensional image of the target object from the reconstruction server, and the acquisition request carrying information of the target object. The reconstruction server is configured to send an acquisition response to the fitting mirror based on the information of the target object, the acquisition response carrying the three-dimensional image of the target object.

At least one embodiment of the present disclosure also provides a model training system. The model training system may include a training server and a second camera. The structure of the model training system may refer to the structure shown in the model training system shown in FIG. 2. The training server may include the training module shown in the foregoing embodiment.

A person skilled in the art may clearly understand that, for the convenience and brevity of the description, the working process of the above-described system and apparatus may refer to the corresponding process in the foregoing method embodiments, and details are not described herein again.

At least embodiment of the present disclosure further provides a non-volatile computer-readable storage medium configured to store at least one code instruction therein. The at least one code instruction, when executed by a processor, enables the processor to perform the three-dimensional reconstruction method described in the above embodiments, e.g., the three-dimensional reconstruction method shown in FIG. 3, FIG. 5, or FIG. 6.

At least embodiment of the present disclosure further provides a computer-readable storage medium which is a non-volatile storage medium configured to store at least one code instruction therein, The at least one code instruction, when executed by a processor, enables the processor to perform the model training method described in the above embodiments, e.g., the training process shown in FIG. 7.

The terms "first" and "second" used in the present disclosure are merely used to describe but not denote or imply any relative importance. The term "a plurality of" means two or more, unless otherwise expressly provided.

It should be understood by a person ordinary skill in the art that, all or part of the steps of the above embodiments may be implemented by hardware, or by programs that give instructions to respective hardware. The programs may be stored in a computer-readable storage medium which may be a read-only memory, a magnetic disk or an optical disk or the like.

The above are just the optional embodiments of the present disclosure, which does not limit the present disclosure. Any modifications, equivalent replacements and improvements made within the spirits and principles of the present disclosure shall all fall in the protection scope of the present disclosure.

What is claimed is:

1. A three-dimensional reconstruction method, comprising:

acquiring first images captured by a first camera, each of the first images being an image containing a target object;

determining a shooting angle of the each of the first images, the shooting angle being configured to characterize a shooting direction relative to the target object when the first camera shoots the first images;

determining an angle interval corresponding to the each of the first images from a plurality of angle intervals included in an angle range [0, 360°) based on the shooting angle, and setting the first image as a target image in the angle interval; and three-dimensionally reconstructing the target object based on the target images in the respective angle intervals to obtain a three-dimensional image of the target object;

wherein determining the shooting angle of the each of the first images comprises: inputting the first image into an angle recognition model; receiving angle information outputted by the angle recognition model; and determining the angle information as the shooting angle, wherein the angle recognition model is a model obtained by learning and training sample images and shooting angles of the sample images, and a model training method configured to train the angle recognition model comprising:

training a plurality of times until the accuracy of classifying shooting angles of sample images in a training image set by the angle recognition model reaches a predetermined threshold, wherein the training comprises:

acquiring sample images containing a sample object captured by a second camera and a depth map corresponding to each of the sample images;

acquiring a first key point and a second key point of the sample object from the depth map;

determining a shooting angle of the each of the sample images based on three-dimensional coordinates of the first key point and three-dimensional coordinates of the second key point by calculating a shooting angle of the sample image by using an angle calculation formula, the shooting angle being configured to characterize a direction relative to the sample object when the second camera shoots the sample images, and the angle calculation formula being:

$$\begin{cases} V_1 = (x_2 - x_1,\ z_2 - z_1) \\ V_2 \times V_1 = 0 \\ \alpha = \arccos\left(\dfrac{V_2 \times V_Z}{\|V_2\| \times \|V_Z\|}\right); \\ \|V_2\| = \|V_Z\| = 1 \end{cases}$$

wherein the three-dimensional coordinates of the first key point are (x1, y1, z1), and the three-dimensional coordinates of the second key point are (x2, y2, z2); V1 represents a vector of a connection line between the first key point and the second key point in an XZ plane in a world coordinate system; V2 represents a unit vector perpendicular to V1; VZ represents a unit vector parallel to the Z axis in the world coordinate system; and a represents the shooting angle; and inputting the sample image into a deep learning model to obtain a predicted shooting angle of the sample image, and determining a classification accuracy of the shooting angle according to the shooting angle and the predicted shooting angle of the sample image.

2. The method according to claim 1, wherein after acquiring the first images captured by the first camera, the method further comprises:

assigning a tag to the each of the first images, the tag being configured to mark the target object in the first image; and classifying the first images containing the target object into an image set based on the tag of the each of the first images;

prior to three-dimensionally reconstructing the target object based on the target images in the respective angle intervals to obtain the three-dimensional image of the target object, the method further comprises:

acquiring the first images corresponding to the respective angle intervals based on the image set.

3. The method according to claim 2, wherein after determining the angle interval corresponding to the each of the first images from the plurality of angle intervals included in the angle range [0, 360°) based on the shooting angle, the method further comprises:

identifying, for each of the plurality of angle intervals, whether the image set comprises a plurality of first images corresponding to the angle interval;

quality-scoring the plurality of first images to obtain an image quality score of the each of the first images in the plurality of first images, in response to identifying that the image set comprises the plurality of first images corresponding to the angle interval; and reserving the first image with the highest image quality score, and deleting the remaining first images.

4. The method according to claim 1, wherein after acquiring the first images captured by the first camera, the method further comprises:

identifying whether a resolution of the each of the first images is less than a resolution threshold;

deleting the first image in response to identifying that the resolution of the first image is less than the resolution threshold; and modifying the first image as an image with a specified resolution in response to identifying that the resolution of the first image is not less than the resolution threshold, wherein the specified resolution is greater than or equal to the resolution threshold.

5. The method according to claim 1, wherein three-dimensionally reconstructing the target object based on the target images in the respective angle intervals to obtain the three-dimensional image of the target object comprises:

three-dimensionally reconstructing, when the each of the plurality of angle intervals is provided with a corresponding target image, the target object based on the target image in each of the angle intervals to obtain a three-dimensional image of the target object.

6. The method according to claim 1, wherein three-dimensionally reconstructing the target object based on the target images in the respective angle intervals to obtain the three-dimensional image of the target object comprises:

acquiring, when the three-dimensional reconstruction instruction is received, a plurality of first images based on information of the target object carried by a three-dimensional reconstruction instruction;

determining the corresponding angle intervals of the plurality of first images based on the plurality of first images, and determining the plurality of first images as target images in the corresponding angle intervals;

three-dimensionally reconstructing the target object based on the target images in the respective angle intervals to obtain a three-dimensional image of the target object; and identifying whether the three-dimensional image is an incomplete three-dimensional image; and repairing the incomplete three-dimensional image in response to identifying that the three-dimensional image is the incomplete three-dimensional image to obtain a repaired three-dimensional image.

7. A three-dimensional reconstruction apparatus, comprising:

a processor; and a memory for storing at least one program code executable by the processor, wherein the at least one program code, when executed by the processor, enables the processor to perform:

acquiring first images captured by a first camera, each of the first images being an image containing a target object;

determining a shooting angle of the each of the first images by using an angle recognition model, the shooting angle being configured to characterize a shooting direction relative to the target object when the first camera shoots the first images, and the angle recognition model being a model obtained by learning and training sample images and shooting angles of the sample images;

determining an angle interval corresponding to the each of the first images from a plurality of angle intervals included in an angle range [0, 360°) based on the shooting angle of the first image, and set the first image as a target image in the angle interval; and three-dimensionally reconstructing the target object based on the target images in the respective angle intervals to obtain a three-dimensional image of the target object;

wherein determining the shooting angle of the each of the first images comprises: inputting the first image into an angle recognition model; receiving angle information outputted by the angle recognition model; and determining the angle information as the shooting angle, wherein the angle recognition model is a model obtained by learning and training sample images and shooting angles of the sample images, and a model training method configured to train the angle recognition model comprising:

training a plurality of times until the accuracy of classifying shooting angles of sample images in a training image set by the angle recognition model reaches a predetermined threshold, wherein the training comprises:
acquiring sample images containing a sample object captured by a second camera and a depth map corresponding to each of the sample images;
acquiring a first key point and a second key point of the sample object from the depth map;
determining a shooting angle of the each of the sample images based on three-dimensional coordinates of the first key point and three-dimensional coordinates of the second key point by calculating a shooting angle of the sample image by using an angle calculation formula, the shooting angle being configured to characterize a direction relative to the sample object when the second camera shoots the sample images, and the angle calculation formula being:

$$\begin{cases} V_1 = (x_2 - x_1, z_2 - z_1) \\ V_2 \times V_1 = 0 \\ \alpha = \arccos\left(\frac{V_2 \times V_Z}{\|V_2\| \times \|V_Z\|}\right); \\ \|V_2\| = \|V_Z\| = 1 \end{cases}$$

wherein the three-dimensional coordinates of the first key point are (x1, y1, z1), and the three-dimensional coordinates of the second key point are (x2, y2, z2); V1 represents a vector of a connection line between the first key point and the second key point in an XZ plane in a world coordinate system; V2 represents a unit vector perpendicular to V1; VZ represents a unit vector parallel to the Z axis in the world coordinate system; and a represents the shooting angle; and
inputting the sample image into a deep learning model to obtain a predicted shooting angle of the sample image, and determining a classification accuracy of the shooting angle according to the shooting angle and the predicted shooting angle of the sample image.

8. The apparatus according to claim 7, wherein the at least one program code, when executed by the processor, enables the processor to perform:
assigning a tag to the each of the first images, the tag being configured to mark the target object in the first image; and
classifying the first images containing the target object into an image set based on the tag of the each of the first images;
prior to three-dimensionally reconstructing the target object based on the target images in the respective angle intervals to obtain the three-dimensional image of the target object, the at least one program code, when executed by the processor, enables the processor to perform:
acquiring the first images corresponding to the respective angle intervals based on the image set.

9. The apparatus according to claim 8, wherein the at least one program code, when executed by the processor, enables the processor to perform:
identifying, for each of the plurality of angle intervals, whether the image set comprises a plurality of first images corresponding to the angle interval;
quality-scoring the plurality of first images to obtain an image quality score of the each of the first images in the plurality of first images, in response to identifying that the image set comprises the plurality of first images corresponding to the angle interval; and
reserving the first image with the highest image quality score, and deleting the remaining first images.

10. The apparatus according to claim 7, wherein the at least one program code, when executed by the processor, enables the processor to perform:
identifying whether a resolution of the each of the first images is less than a resolution threshold;
deleting the first image in response to identifying that the resolution of the first image is less than the resolution threshold; and
modifying the first image as an image with a specified resolution in response to identifying that the resolution of the first image is not less than the resolution threshold, wherein the specified resolution is greater than or equal to the resolution threshold.

11. The apparatus according to claim 7, wherein in order to three-dimensionally reconstruct the target object based on the target images in the respective angle intervals to obtain the three-dimensional image of the target object, the at least one program code, when executed by the processor, enables the processor to perform:
three-dimensionally reconstructing, when the each of the plurality of angle intervals is provided with a corresponding target image, the target object based on the target image in each of the angle intervals to obtain a three-dimensional image of the target object.

12. A three-dimensional reconstruction system, comprising a reconstruction server and a first camera, wherein the reconstruction server comprises the three-dimensional reconstruction apparatus as defined in claim 7.

13. The system according to claim 12, further comprising a fitting mirror, wherein
the fitting mirror is configured to, when a target object is detected, send an acquisition request to the reconstruction server, the acquisition request carrying information of the target object; and
the reconstruction server is configured to send an acquisition response to the fitting mirror based on the information of the target object, the acquisition response carrying a three-dimensional image of the target object.

14. A model training method, configured to train an angle recognition model, the method comprising:
training a plurality of times until the accuracy of classifying shooting angles of sample images in a training image set by the angle recognition model reaches a predetermined threshold, wherein the training comprises:
acquiring sample images containing a sample object captured by a second camera and a depth map corresponding to each of the sample images;
acquiring a first key point and a second key point of the sample object from the depth map;
determining a shooting angle of the each of the sample images based on three-dimensional coordinates of the first key point and three-dimensional coordinates of the second key point by calculating a shooting angle of the sample image by using an angle calculation formula, the shooting angle being configured to characterize a direction relative to the sample object when the second camera shoots the sample images, and the angle calculation formula being:

$$\begin{cases} V_1 = (x_2 - x_1,\ z_2 - z_1) \\ V_2 \times V_1 = 0 \\ \alpha = \arccos\left(\dfrac{V_2 \times V_Z}{\|V_2\| \times \|V_Z\|}\right); \\ \|V_2\| = \|V_Z\| = 1 \end{cases}$$

wherein the three-dimensional coordinates of the first key point are (x1, y1, z1), and the three-dimensional coordinates of the second key point are (x2, y2, z2); V1 represents a vector of a connection line between the first key point and the second key point in an XZ plane in a world coordinate system; V2 represents a unit vector perpendicular to V1; VZ represents a unit vector parallel to the Z axis in the world coordinate system; and a represents the shooting angle; and inputting the sample image into a deep learning model to obtain a predicted shooting angle of the sample image, and determining a classification accuracy of the shooting angle according to the shooting angle and the predicted shooting angle of the sample image.

15. The method according to claim 14, wherein after determining the shooting angle of the each of the sample images based on the three-dimensional coordinates of the first key point and the three-dimensional coordinates of the second key point, the training further comprises:

identifying, based on the sample image, whether an orientation posture of the sample object relative to the second camera is a back-facing orientation posture; and correcting the shooting angle by using a correction calculation formula, when the orientation posture of the sample object relative to the second camera is the back-facing orientation posture to obtain a corrected shooting angle, wherein the correction calculation formula is:

α1=α2+180°;

wherein α1 is the corrected shooting angle; and α2 is the shooting angle before correction.

16. The method according to claim 14, wherein prior to determining the shooting angle of each of the sample images based on the three-dimensional coordinates of the first key point and the three-dimensional coordinates of the second key point, the training further comprises:

identifying whether a distance between the first key point and the second key point is less than a distance threshold; and determining that the shooting angle of the sample image is a specified angle in the case that the distance between the first key point and the second key point is less than the distance threshold, wherein the specified angle is any angle within an angle interval of a fixed range.

17. A non-volatile computer-readable storage medium storing at least one code instruction, wherein the at least one code instruction, when executed by a processor, enables the processor to perform the three-dimensional reconstruction method as defined in claim 1.

* * * * *